(12) United States Patent
Sarri et al.

(10) Patent No.: US 8,876,469 B2
(45) Date of Patent: Nov. 4, 2014

(54) CENTERING DEVICE AND SYSTEM FOR DRIVING RING

(75) Inventors: Franco Sarri, Florence (IT); Giuseppe Iurisci, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 573 days.

(21) Appl. No.: 13/194,113

(22) Filed: Jul. 29, 2011

(65) Prior Publication Data

US 2012/0051891 A1 Mar. 1, 2012

(30) Foreign Application Priority Data

Aug. 31, 2010 (IT) ................ CO2010A0049

(51) Int. Cl.
*F04D 29/56* (2006.01)
*F02C 9/20* (2006.01)
*F01D 17/16* (2006.01)
*F04D 29/46* (2006.01)

(52) U.S. Cl.
CPC ............ *F02C 9/20* (2013.01); *F01D 17/165* (2013.01); *F04D 29/462* (2013.01); *F04D 29/464* (2013.01); *F05D 2230/64* (2013.01); *F05D 2260/52* (2013.01)
USPC .......................................... 415/150; 415/159

(58) Field of Classification Search
USPC .................. 415/150, 151, 159–166
See application file for complete search history.

(56) References Cited

U.S. PATENT DOCUMENTS 4,035,101 A * 7/1977 Glenn ..................... 415/160
2007/0154301 A1 7/2007 Hartmann et al.

FOREIGN PATENT DOCUMENTS

| GB | 1281786 | 7/1972 |
|---|---|---|
| WO | 0240832 A1 | 5/2002 |
| WO | 2010031768 A2 | 3/2010 |

OTHER PUBLICATIONS

Italian Search Report and Written Opinion issued in connection with IT Application No. CO2010A000049, Mar. 24, 2011.

* cited by examiner

*Primary Examiner* — Edward Look
*Assistant Examiner* — Danielle M Christensen
(74) *Attorney, Agent, or Firm* — GE Global Patent Operation

(57) ABSTRACT

A centering device includes a pivoting part configured to pivot around a first axis that extends along an axial direction of a hole formed in the pivoting part; a roller attached to a first end of the pivoting part and configured to rotate; a rod attached to a second end of the pivoting part and configured to move along a second axis; a spring mechanism enclosing a part of the rod and configured to apply a biasing force to the pivoting part; and a rod housing configured to receive an end of the rod and to allow the rod to freely move through the rod housing.

24 Claims, 11 Drawing Sheets

CENTERING DEVICE AND SYSTEM FOR DRIVING RING

BACKGROUND OF THE INVENTION

1. Field of the Invention

Embodiments of the subject matter disclosed herein generally relate to methods and devices and, more particularly, to mechanisms and techniques for centering a driving ring in an inlet guide vane mechanism.

2. Description of Related Art

During the past years, the importance of compressors in various industries has increased. The compressors are used in engines, turbines, power generation, cryogenic applications, oil and gas, petrochemistry, etc. Thus, more research is performed for improving the efficiency of this turbomachine.

A compressor 10 includes, as shown in FIG. 1, a casing 12 that houses a shaft 14 to which an impeller 16 is attached. An inlet 18 of the compressor 10 provides the medium (usually gas) to the impeller. However, an amount of gas and a direction of the gas arriving at the impeller needs to be controlled during various functioning stages of the compressor.

An inlet guide vane (IGV) mechanism 20 may be installed in the inlet 18 for controlling the amount of gas and the direction 22 of the gas provided to the impeller 16 of the compressor 10. Such an IGV mechanism 20 is shown in FIG. 2 having a blade support disk 24 configured to hold a plurality of vanes 26. FIG. 2 shows, for simplicity, only two vanes 26. Each blade 26 is connected to a rod 28 that is configured to rotate along a longitudinal axis. A rotation of the rod 28 determines a rotation of a corresponding blade 26. Rod 28 is actuated via, for example, arms 30 and 32. Arm 30 connects to arm 32 through a bolt 34. Arm 32 is connected with a bolt 36 to a driving ring 40. The rotation of the driving ring 40 determines arms 30 and 32 to turn rod 28, and thus, blade 26. In this way, an amount of gas and a direction of the gas entering the impeller 16 is controlled by the rotation of the driving ring 40.

However, when applying a large force on the driving ring 40, for rotating it, the driving ring may also be displaced from its position, which is undesirable. Another problem that is encountered by the existing IGVs is the large thermal expansion. As the gas is forced at certain angles through the IGV, the temperature of the gas increases and the thermal expansions of the driving ring and a casing housing the driving ring may be different, which may result either in the driving ring becoming stuck to the casing or the driving ring becoming off centre. These problems of the driving ring may impact negatively the functioning of the ring and the capability to close or open the blades of the IGV, thus, impacting the functioning of the compressor.

Hartmann et al. (U.S. Patent Application Publication no. 2007/0154301, the entire content of which is incorporated herein by reference) discloses a device for supporting a ring and the device include plural levers that have a corresponding roller. The plural levers are fixed to a blade carrier and the rollers contact an adjusting ring so that the adjusting ring is supported by the rollers.

Wall (GB Patent 1 281 786, the entire content of which is incorporated herein by reference) also discloses a structure that includes rollers 159 for centering a ring 146. However, both references have a limited capability to accommodate large thermal expansions of the ring or the rollers' support or for adjusting an applied force.

Accordingly, it would be desirable to provide devices and methods that overcome the afore-described problems and drawbacks.

BRIEF SUMMARY OF THE INVENTION

According to one exemplary embodiment, there is a centering device for centering a driving ring. The centering device includes a pivoting part configured to pivot around a first axis that extends along an axial direction of a hole formed in the pivoting part; a roller attached to a first end of the pivoting part and configured to rotate; a rod attached to a second end of the pivoting part and configured to move along a second axis; a spring mechanism enclosing a part of the rod and configured to apply a biasing force to the pivoting part; and a rod housing configured to receive an end of the rod and to allow the rod to freely move through the rod housing.

According to another exemplary embodiment, there is an inlet guide vane mechanism. The inlet guide vane mechanism includes a guide vane plate configured to hold a plurality of vanes; a cartridge; a driving ring provided between the guide vane plate and the cartridge and configured to rotate the plurality of vanes; and at least two centering devices attached to the cartridge and configured to center the driving ring. A centering device includes, a pivoting part configured to pivot around a first axis that extends along an axial direction of a hole formed in the pivoting part; a roller attached to a first end of the pivoting part and configured to rotate; a rod attached to a second end of the pivoting part and configured to move along a second axis; a spring mechanism enclosing a part of the rod and configured to apply a biasing force to the pivoting part; and a rod housing configured to receive an end of the rod and to allow the rod to freely move through the rod housing.

According to still another exemplary embodiment, there is a turbomachine that includes a casing having an inlet and an outlet; a shaft having an impeller provided inside the casing; and an inlet guide vane mechanism. The inlet guide vane mechanism includes a guide vane plate configured to hold a plurality of vanes, a cartridge, a driving ring provided between the guide vane plate and the cartridge and configured to rotate the plurality of vanes, and at least two centering devices attached to the cartridge and configured to center the driving ring. A centering device includes, a pivoting part configured to pivot around a first axis that extends along an axial direction of a hole formed in the pivoting part; a roller attached to a first end of the pivoting part and configured to rotate; a rod attached to a second end of the pivoting part and configured to move along a second axis; a spring mechanism enclosing a part of the rod and configured to apply a biasing force to the pivoting part; and a rod housing configured to receive an end of the rod and to allow the rod to freely move through the rod housing.

BRIEF DESCRIPTION OF THE SEVERAL VIEWS OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an IGV of a compressor. However, the embodiments to be discussed next are not limited to these systems, but may be applied to other systems that require the control of a fluid input to a turbomachine.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a driving ring is supported by plural centering devices that are configured to center the driving ring. The centering may be continuous and automatic.

Figure 1:
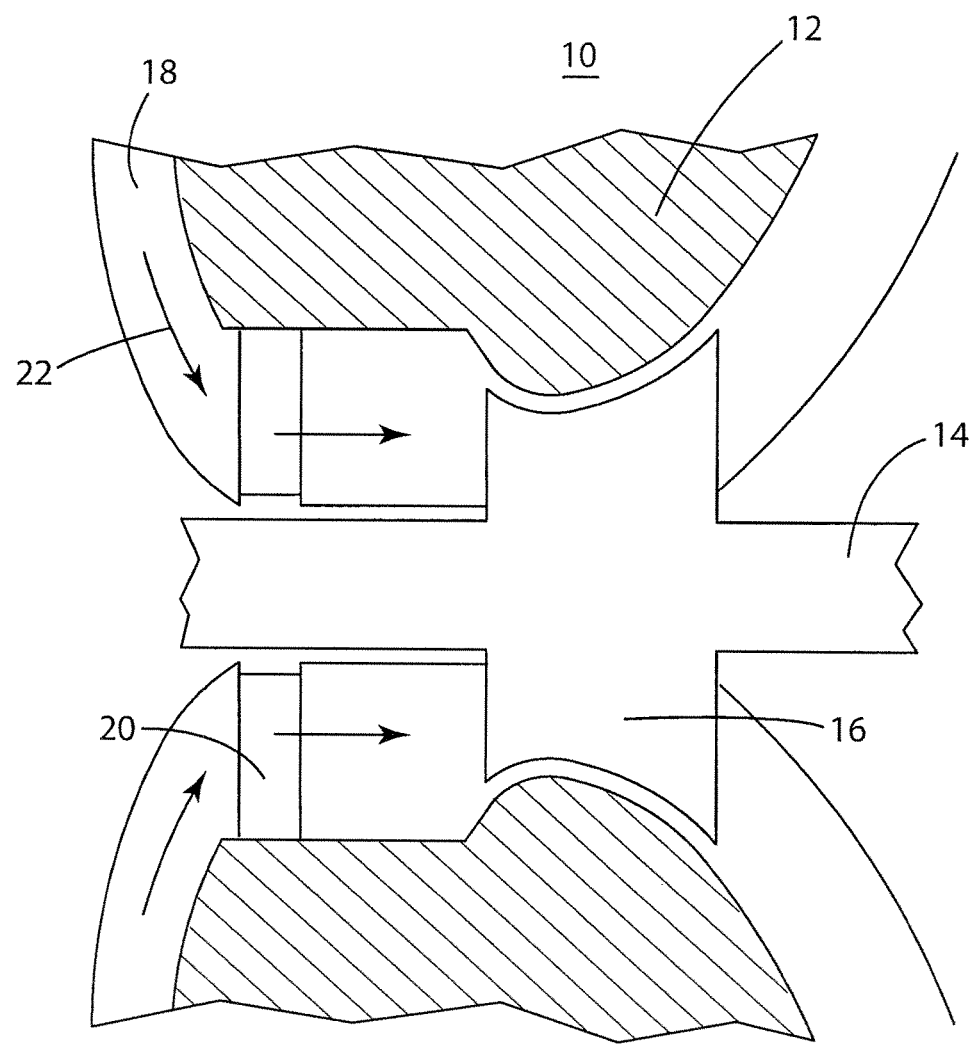
FIG. 1 is a schematic diagram of a conventional compressor.
Figure 2:
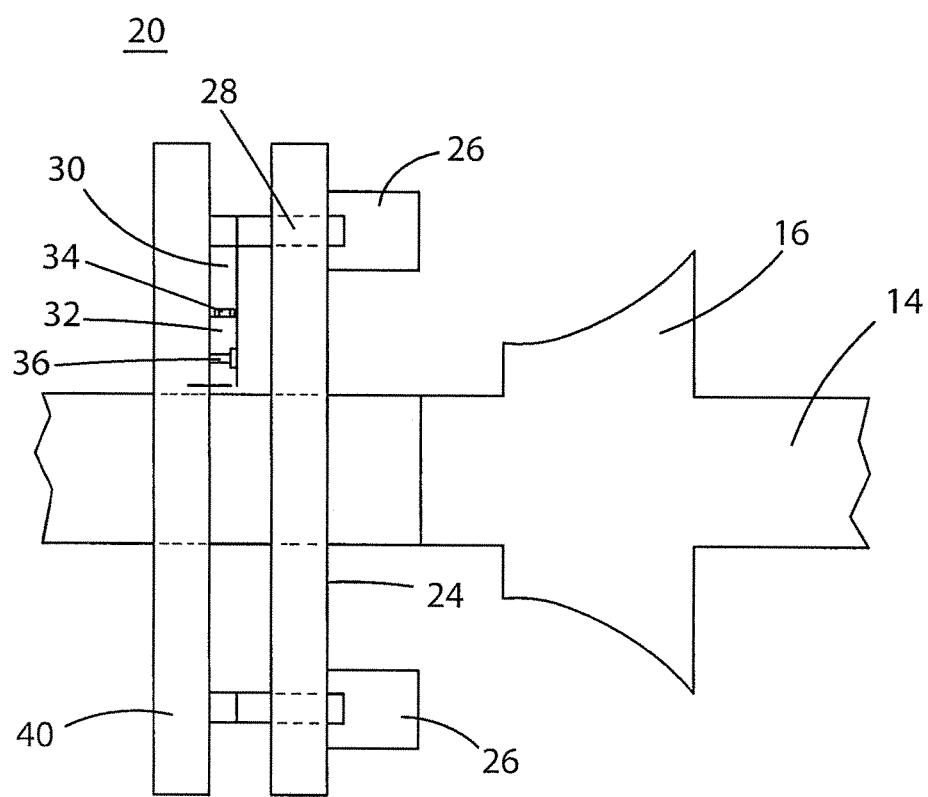
FIG. 2 is a schematic diagram of a conventional inlet guide vane mechanism.
Figure 3:
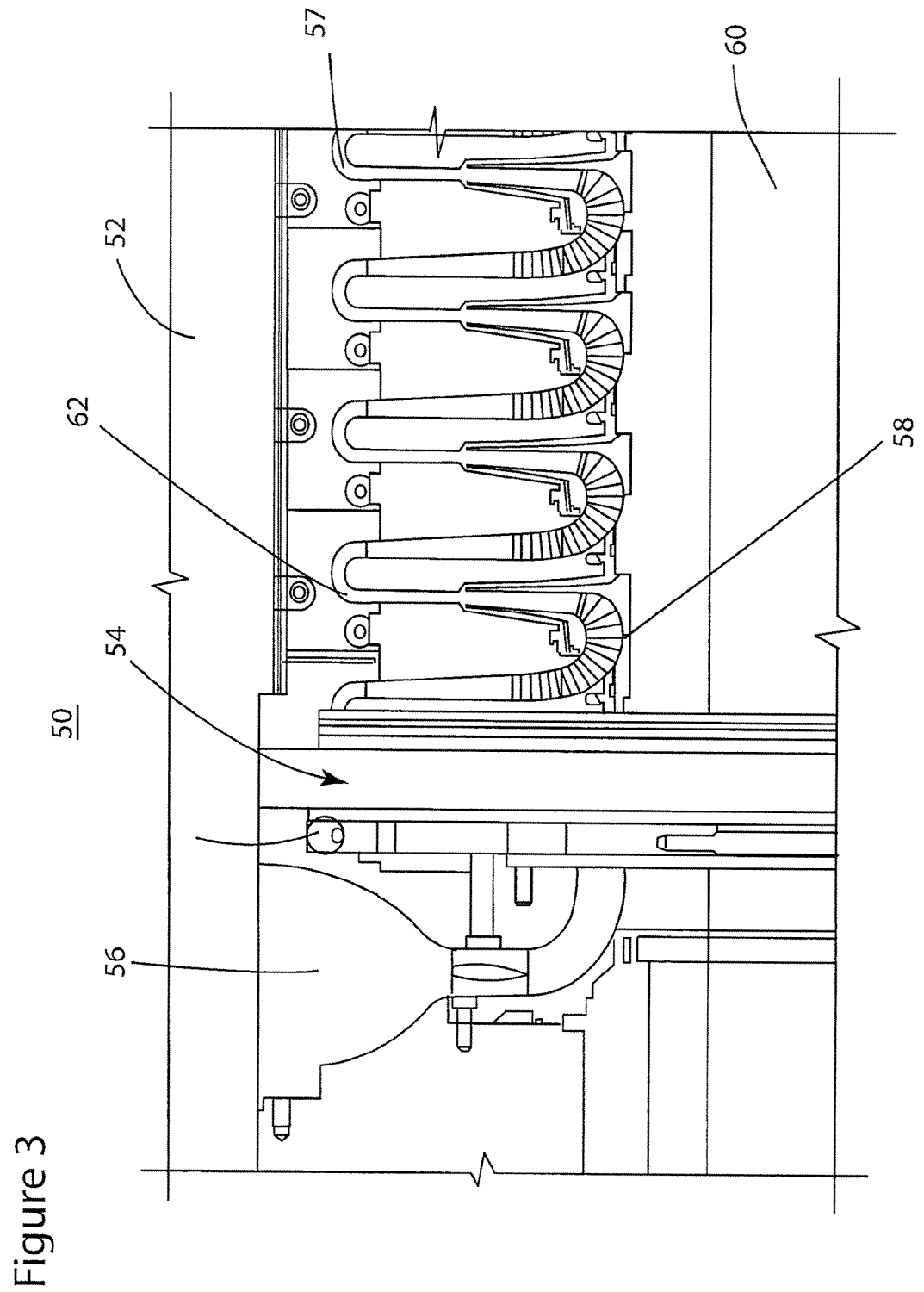
FIG. 3 is a schematic diagram of a compressor having a novel inlet guide mechanism according to an exemplary embodiment.

As shown in FIG. 3, a compressor 50 may include a casing 52 that houses the IGV mechanism 54, which is placed between an inlet 56 of the compressor and an impeller 58. The compressor has also an outlet 57. After gas passes the IGV mechanism 54 it enters the impeller 58 of a first stage of the compressor. The impeller 58 is attached to a shaft 60 of the compressor. After passing the impeller 58, the gas arrives in a diffuser 62. The impeller 58 and the diffuser 62 form a first stage of the compressor 50. The gas from the diffuser 62 enters a new stage of the compressor and so on. Thus, the IGV mechanism 54 is provided inside casing 52 and around shaft 60.

Figure 4:
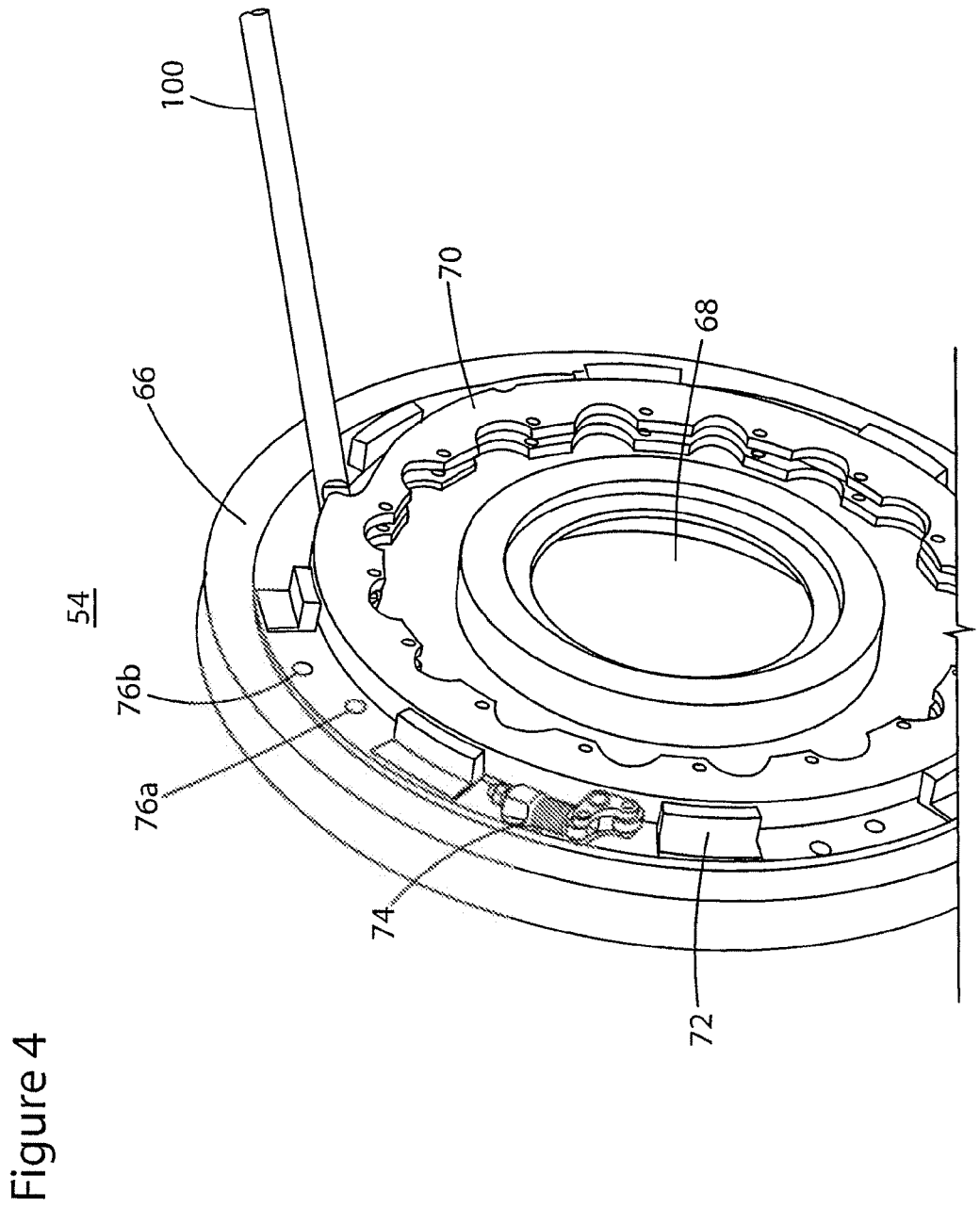
FIG. 4 is a schematic diagram of a centering device and a driving ring according to an exemplary embodiment.

The IGV mechanism 54 is shown, according to an exemplary embodiment, in FIG. 4. A cartridge 66 is configured to partially house a driving ring 70. In one application, the cartridge 66 may be fixedly attached to the inner casing of the compressor. The cartridge 66 may have a hole 68 that is configured to receive the shaft 60.

The driving ring 70 is facing the cartridge 66 and may be rotationally attached to the cartridge 66 as discussed later. The cartridge 66 may include guiding elements 72 that are configured to surround (partially or totally) the driving ring 70 when placed next to the cartridge 66.

Figure 5:
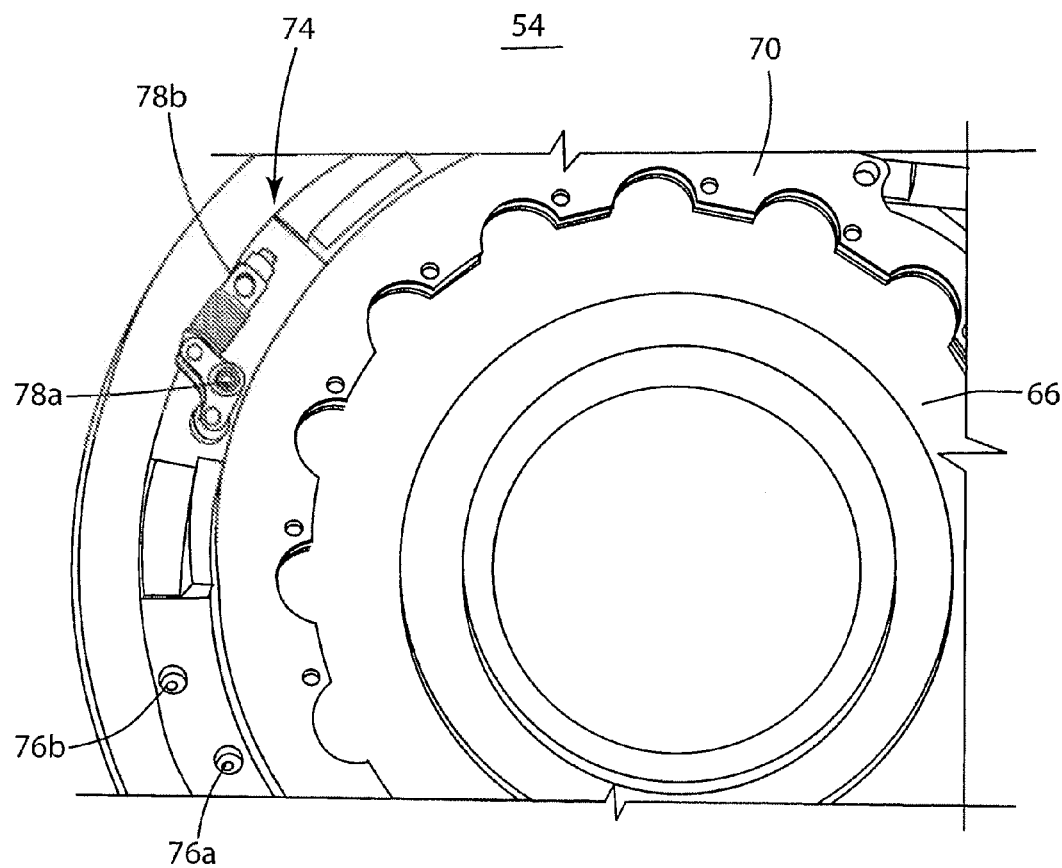
FIG. 5 is a schematic diagram of a centering device and its attachment points according to an exemplary embodiment.

Plural centering devices 74 are also provided on the cartridge 66, around the driving ring 70, for supporting the driving ring 70. A single centering device 74 is shown in FIG. 4 for simplicity. However, more centering devices may be used, for example, six. The centering device 74 may be rotatably connected to the cartridge 66 at two locations. These two locations 76a and 76b are, e.g., holes (threaded or not) in the cartridge 66. As shown in FIG. 5, two corresponding bolts or screws 78a and 78b are used to attach the centering device 74 to the cartridge 66.

Figure 6:
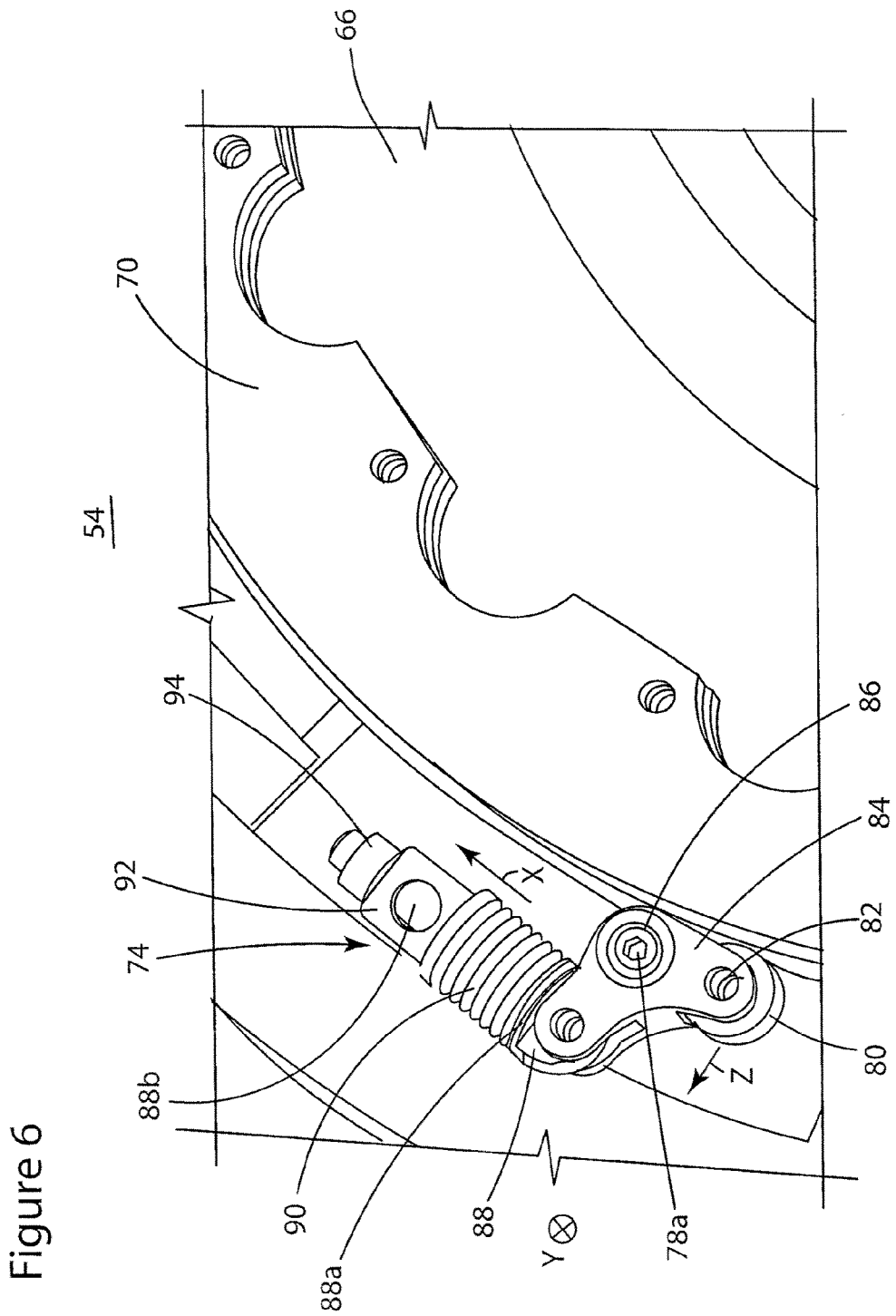
FIG. 6 is a schematic diagram of a centering device.

Although two screws 78a and 78b are used to attach the centering device 74 to the cartridge 66, the centering device is still capable of moving and/or rotating as discussed next. FIG. 6 shows the centering device 74 and its details. It is noted that the screw (or pin or bolt or other means for attaching to the cartridge 66) 78a is visible while the screw 78b is not visible. This will be clarified shortly.

The centering device 74 includes a roller 80 connected, e.g., via a pin 82, to a pivoting part 84. The pivoting part 84 has a hole 86 through which the screw 78a is inserted into the cartridge 66. The screw 78a is designed to not press the pivoting part 84 against the cartridge 66 so that the pivoting part 84 can pivot freely around screw 78a. Also, in one application, the hole 86 has no threads and is larger than an outer diameter of the screw 78a.

Pivoting part 84 is configured to be connected to a rod 88. The connection between the pivoting part 84 and the rod 88 is achieved, e.g., by a pin. However, other connections are possible as long as both the pivoting part 84 can rotate and the rod 88 can move along direction X. A spring mechanism 90 may be provided in contact with one end 88a of the rod 88. End 88a of the rod 88 may be shaped in such a way to not allow the spring mechanism 90 to pass past the end, i.e., like a stopper. The other end of the spring mechanism 90 is facing a rod housing 92, which is configured to receive the other end 88b of the rod 88. Rod 88 is configured to freely move through the rod housing 92.

Figure 7:
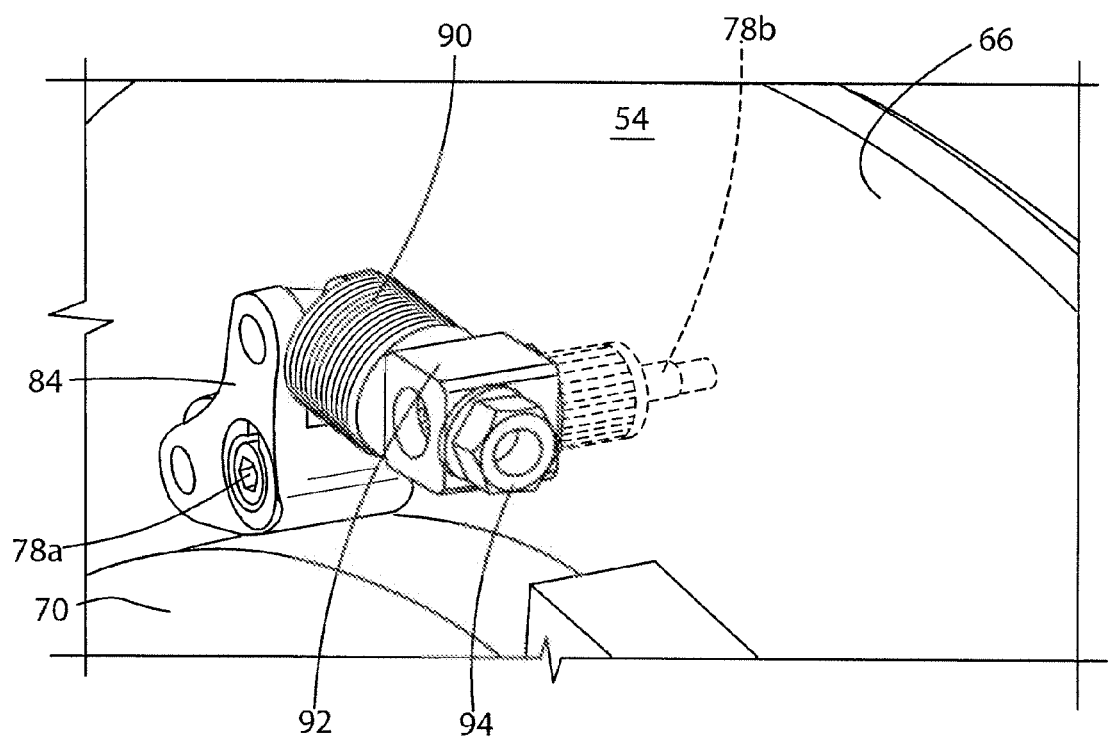
FIG. 7 is a schematic diagram of a rod housing of a centering device according to an exemplary embodiment.

The rod housing 92 is attached with the screw 78b to the cartridge 66 from an inside of the rod housing 92, as shown in FIG. 7. For this reason, when the rod 88 is inserted into the rod housing 92 as shown in FIG. 6, the screw 78b is hidden by the rod 88. Screw 78b is such designed to rotatably connect the rod housing 92 to the cartridge 66 allowing the rod housing 92 to freely rotate around the screw 78b. Thus, this arrangement allows the pivoting part 84 to rotate around the screw 78a and the rod 88 to move along direction X through the rod housing 92. Although FIGS. 6 and 7 show a nut 94 on the end 88b of the rod 88, this nut is removed when the IGV is in operation as will be discussed later.

The spring mechanism 90 may be a spring, a Bellville spring or any other device known in the art that provides an elastic force. Thus, during operation, if the driving ring 70 expands faster (due to thermal expansion) than the cartridge 66, the roller 80 that is in contact with the driving ring 70 is capable to move along radial direction Z in FIG. 6, to accommodate this expansion. As the roller 80 moves along direction Z, the pivoting part 84 pivots around axis Y (shown in FIG. 6 as entering the page) and compressing the spring mechanism 90 while the rod 88 is pushed along the X direction. Because the spring mechanism 90 is compressed, a force opposing to the movement of the roller 80 appears, which tends to center the driving ring 70. It should be remembered that plural centering devices 74 are disposed around driving ring 70.

However, if the cartridge 66 expands faster than the driving ring 70, then the roller 80 moves in the negative Z direction, the spring mechanism 90 is decompressed, which generates a force along the Z direction in the pivoting part 74. Thus, the force exerted by the roller 80 on the driving ring 70 is decreased, determining the centering of the driving ring 70.

While these forces appear in the spring mechanism 90, the end 88b of the rod 88 is free to move through the rod housing 92.

Depending on the temperatures to which the IGV mechanism is exposed, the strength of the spring mechanism 90 may be adjusted, e.g., replacing a weak spring with a stronger spring or vice versa. Thus, the roller 80 responds in different ways to different conditions of the compressor based on the selection of the spring mechanism 90. Thus, the IGV mechanism is capable of handling even large displacements of the driving ring 70 relative to the cartridge 66.

Figure 8:
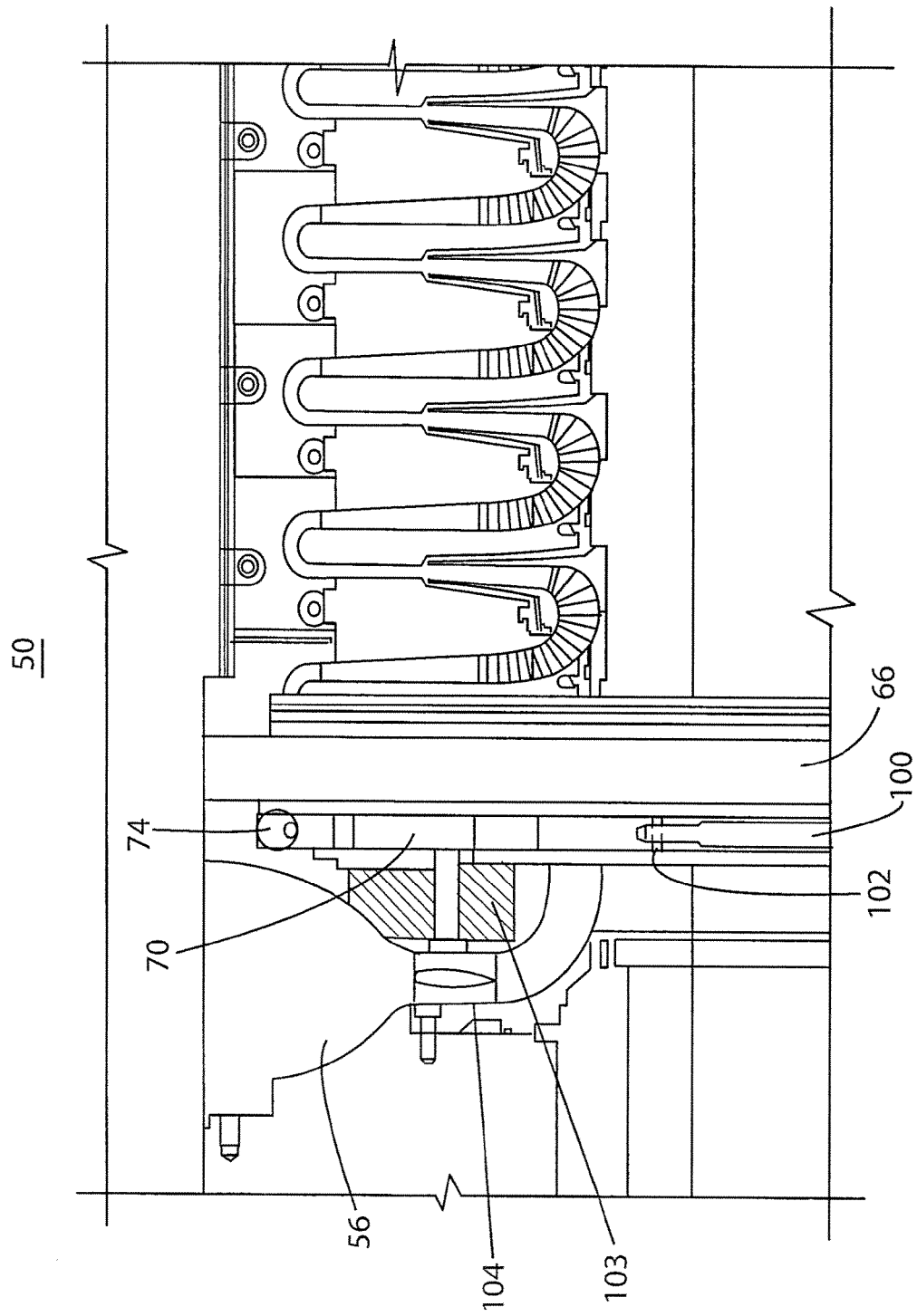
FIG. 8 is a schematic diagram of a compressor having a novel centering device according to an exemplary embodiment.

The distribution of the centering devices 74 is now discussed. With regard to FIG. 8, which is similar to FIG. 4, it is noted that an actuator rod 100 is connected with a pin 102 to the driving ring 70. Other methods for connecting the actuator rod 100 to the driving ring 70 are possible. FIG. 8 also shows a guide vane plate 103 that is configured to support plural vanes 104. Thus, in this embodiment, the driving ring 70 is sandwiched between the cartridge 66 and the guide vane plate 103. The plural vanes 104 are provided to fluidly communicate with inlet 56 of the compressor 50. The vanes 104 are connected via various arms to the driving ring 70. When the vanes 104 need to be rotated to modify the amount of incoming gas, a force is applied to the actuator rod 100 to rotate the driving ring 70, which closes or opens the vanes 104. This force in combination with the different thermal expansions of the driving ring 70 and the cartridge 66 determine the driving ring in the traditional devices to become off center.

Figure 9:
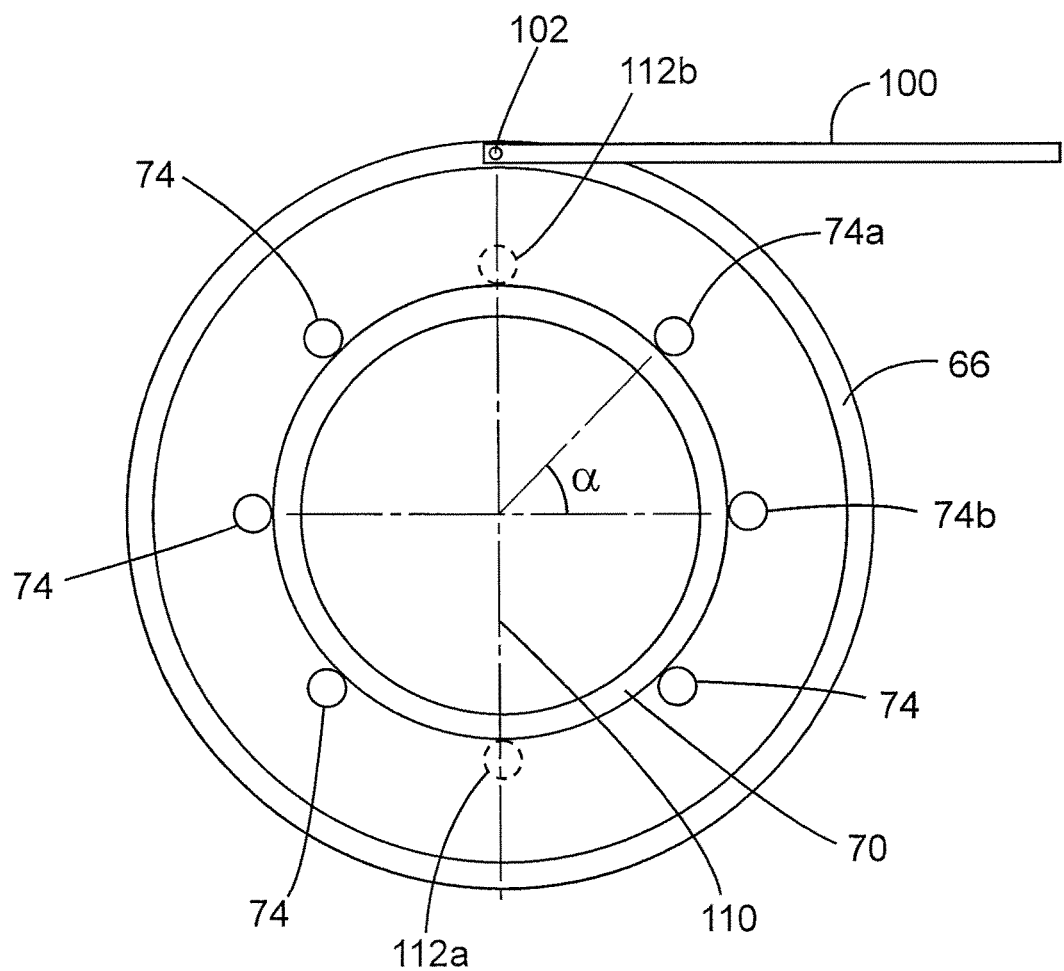
FIG. 9 is a schematic diagram of centering devices provided around a driving ring according to an exemplary embodiment.

However, the novel centering devices 74 correct this problem by centering the driving ring 70 under a large variety of conditions as the centering devices 74 have, as discussed in an exemplary embodiment, the capability to apply a desired force based on the selection of the spring mechanism 90. Another factor that contributes to the centering of the driving ring 70 may be the distribution of the centering devices 74 around the driving ring. In an exemplary embodiment illustrated in FIG. 9, six centering devices 74 (represented by a circle) are shown distributed around the driving ring 70. It is noted that rollers 80 of the centering devices 74 are in contact with the driving ring 70.

According to this exemplary embodiment, the centering devices 74 are distributed opposite to an axis of force 110 of the driving ring 70, which is determined by the connection of the actuator rod 100 to the driving ring 70. In other words, positions 112a and 112b are not favored in this exemplary embodiment. In one application, the centering devices 74 are symmetrically located relative to axis of force 100 and around the driving ring 70. In still another application, an angle α between two adjacent centering devices 74a and 74b on the same side of the axis 110 is between 20° and 60° and may be the same for all the centering devices on the same side of the axis 110. Less or more centering devices may be used.

Figure 10:
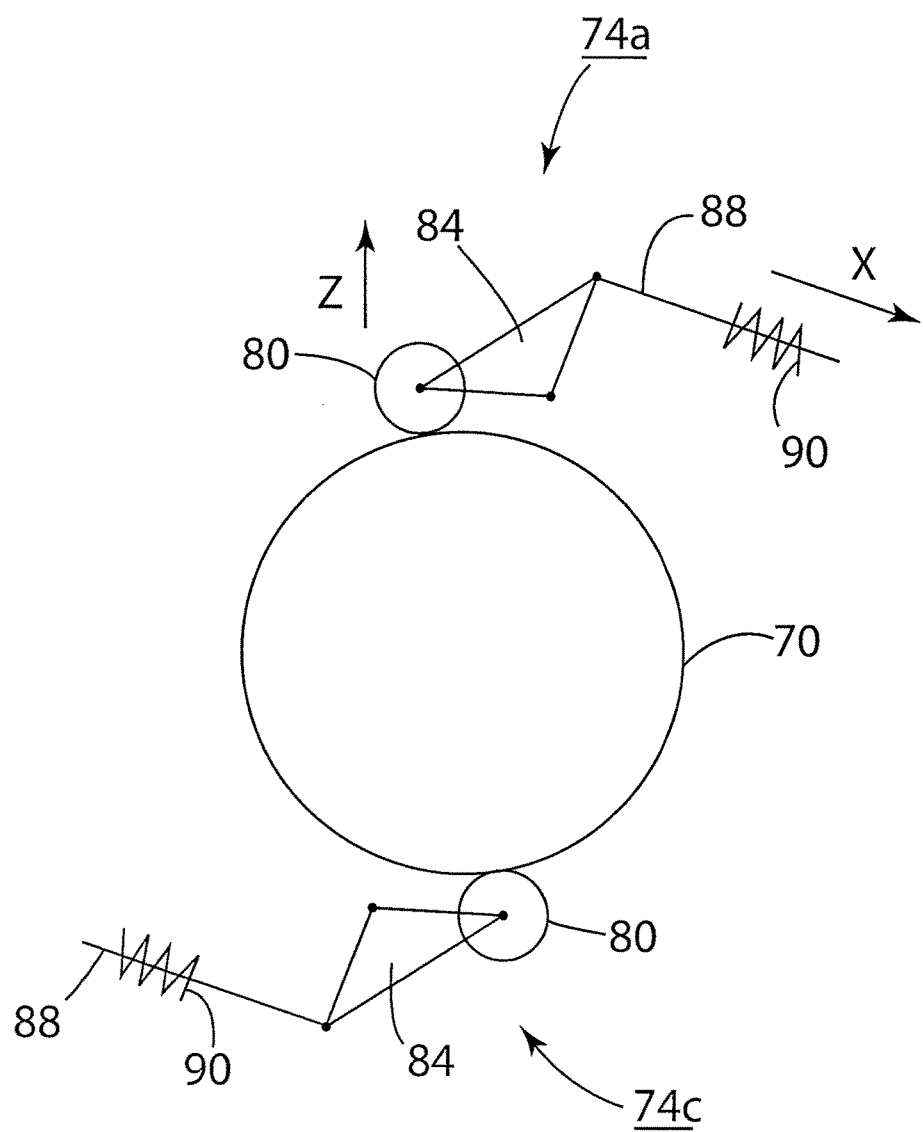
FIG. 10 is a schematic diagram of a movement of a roller of a centering device according to an exemplary embodiment.

In use, the various parts of a centering device 74a move as shown schematically in FIG. 10. When the driving ring 70 tends to move along the positive direction of the axis Z, the roller 80 is pushed along the same direction, which makes the rod 88 to compress the spring mechanism 90 along the positive direction of the axis X. This action determines an increase in a spring force in the spring mechanism 90, which counter balance the movement of the roller 80 upwards. Simultaneously, an opposite centering device 74c acts in the opposite direction, i.e., decreasing a force applied by its roller 80 on the driving ring 70. By the synergic action of two or more of the centering devices 74, when the driving ring 70 becomes off center in one direction, centering devices on that side push the driving ring 70 with an increase force back to a centered position and the opposite centering devices decrease their force to allow the centering ring to come back to its original position.

The novel centering device shown in FIG. 6 exhibits another novel concept that simplify the assembly of the compressor. Those skilled in the art would know that the systems discussed in the Background section are difficult to assembly as their rollers exert a fixed force on a central ring. However, by using the nut 94 shown in FIG. 6, the roller 80 may be raised from the driving ring 70 so that the driving ring 70 may be provided in the cartridge 66 without being affected by the presence of the centering devices 74. Once the driving ring 70 is in place, then the nut 94 is removed and the roller 80 applies the desired pressure on the driving ring 70.

Figure 11:
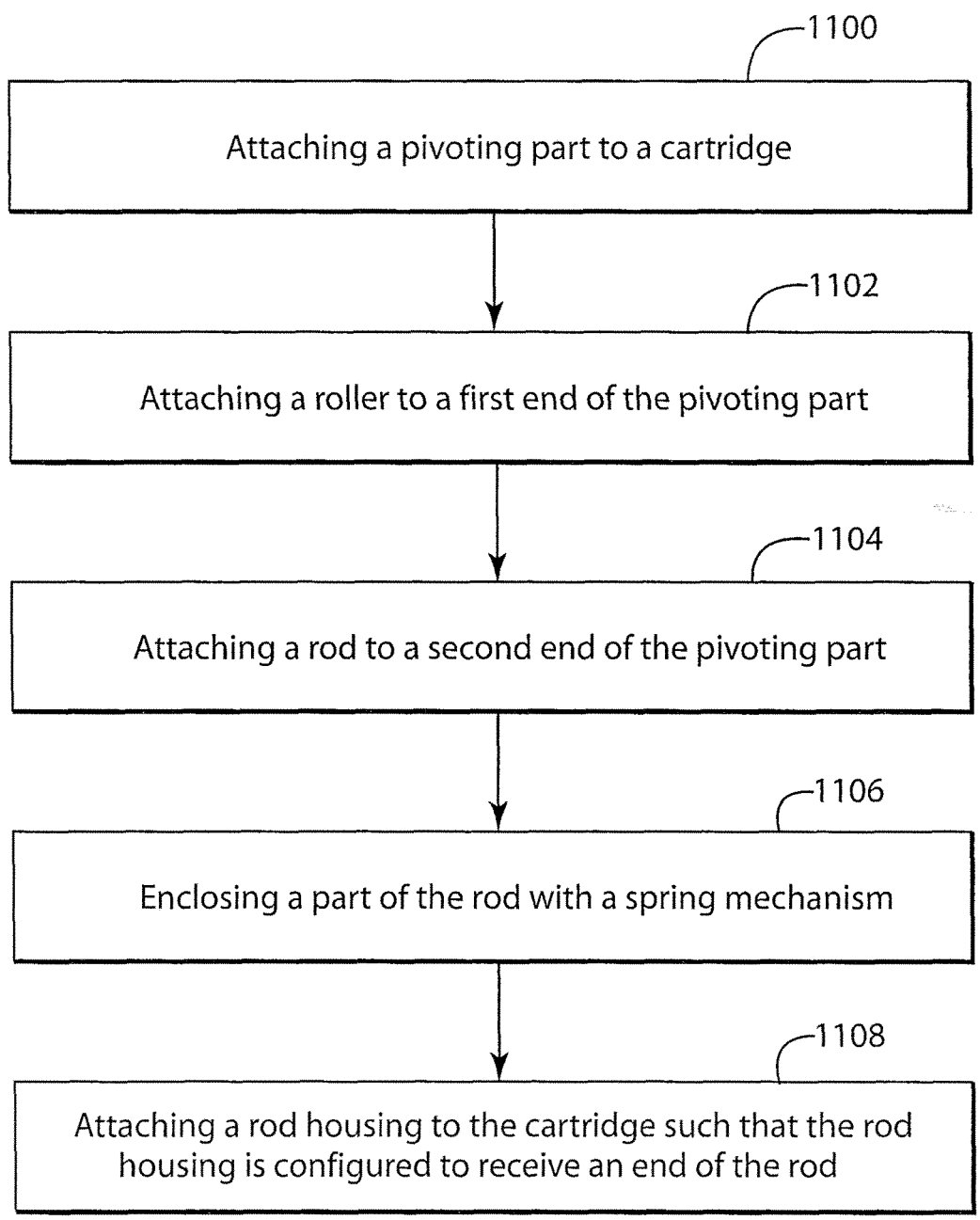
FIG. 11 is a flow chart illustrating a method for assembling a centering device according to an exemplary embodiment.

A method for attaching a centering device to an IGV mechanism is discussed now with regard to FIG. 11. The method includes a step 1100 of attaching a pivoting part to a cartridge such that the pivoting part pivots around a first axis (Y) that extends along an axial direction of a hole formed in the pivoting part; a step 1102 of attaching a roller to a first end of the pivoting part such that the roller is configured to rotate; a step 1104 of attaching a rod to a second end of the pivoting part such that the rod is configured to move along a second axis (X); a step 1106 of enclosing a part of the rod with a spring mechanism such that the spring mechanism is configured to apply a biasing force to the pivoting part; and a step 1108 of attaching a rod housing to the cartridge such that the rod housing is configured to receive an end of the rod and to allow the rod to freely move through the rod housing.

The method may include additional steps of attaching a guide vane plate to the cartridge such that the driving ring is sandwiched between the cartridge and the guide vane plate. This package may be inserted inside a casing of a turbomachine, e.g., a compressor. An actuation rod then may be inserted through a hole in the casing to connect to the driving ring.

The disclosed exemplary embodiments provide a system and a device for centering a driving ring around a shaft of a turbomachine. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A centering device for centering a driving ring, the centering device comprising:

a pivoting part configured to pivot around a first axis that extends along an axial direction of a hole formed in the pivoting part;

a roller attached to a first end of the pivoting part and configured to rotate;

a rod attached to a second end of the pivoting part and configured to move along a second axis;

a spring mechanism enclosing a part of the rod and configured to apply a biasing force to the pivoting part; and a rod housing configured to receive an end of the rod and to allow the rod to freely move through the rod housing.

2. The centering device of claim 1, wherein the end of the rod has a threaded section configured to receive a nut.

3. The centering device of claim 1, further comprising:
a pin connecting the pivoting part to the rod.

4. The centering device of claim 1, wherein the pivoting part is configured to be attached to the cartridge such that the pivoting part is free to pivot.

5. The centering device of claim 4, wherein the rod housing is configured to be attached to the cartridge such that the rod housing is configured to freely rotate.

6. The centering device of claim 1, wherein the roller is configured to contact a driving ring and act on the driving ring with a force generated by the spring mechanism.

7. The centering device of claim 1, wherein the spring mechanism is removable from the rod.

8. The centering device of claim 1, wherein the spring mechanism is a Bellville spring.

9. An inlet guide vane mechanism, the inlet guide vane mechanism comprising:

a guide vane plate configured to hold a plurality of vanes;
a cartridge;
a driving ring provided between the guide vane plate and the cartridge and configured to rotate the plurality of vanes; and
at least two centering devices attached to the cartridge and configured to center the driving ring, wherein a centering device comprising:
a pivoting part configured to pivot around a first axis that extends along an axial direction of a hole formed in the pivoting part;
a roller attached to a first end of the pivoting part and configured to rotate;
a rod attached to a second end of the pivoting part and configured to move along a second axis;
a spring mechanism enclosing a part of the rod and configured to apply a biasing force to the pivoting part; and
a rod housing configured to receive an end of the rod and to allow the rod to freely move through the rod housing.

10. The inlet guide vane mechanism of claim 9, wherein the end of the rod has a threaded section configured to receive a nut.

11. The inlet guide vane mechanism of claim 9, further comprising:
a pin connecting the pivoting part to the rod.

12. The inlet guide vane mechanism of claim 9, wherein the pivoting part is configured to be attached to the cartridge such that the pivoting part is free to pivot.

13. The inlet guide vane mechanism of claim 12, wherein the rod housing is configured to be attached to the cartridge such that the rod housing is configured to freely rotate.

14. The inlet guide vane mechanism of claim 9, wherein the roller is configured to contact a driving ring and act on the driving ring with a force generated by the spring mechanism.

15. The inlet guide vane mechanism of claim 9, wherein the spring mechanism is removable from the rod.

16. The inlet guide vane mechanism of claim 9, wherein the spring mechanism is a Bellville spring.

17. A turbomachine comprising:
a casing having an inlet and an outlet;
a shaft having an impeller provided inside the casing; and
an inlet guide vane mechanism comprising:
a guide vane plate configured to hold a plurality of vanes,
a cartridge,
a driving ring provided between the guide vane plate and the cartridge and configured to rotate the plurality of vanes, and
at least two centering devices attached to the cartridge and configured to center the driving ring, wherein a centering device comprising:
a pivoting part configured to pivot around a first axis that extends along an axial direction of a hole formed in the pivoting part;
a roller attached to a first end of the pivoting part and configured to rotate;
a rod attached to a second end of the pivoting part and configured to move along a second axis;
a spring mechanism enclosing a part of the rod and configured to apply a biasing force to the pivoting part; and
a rod housing configured to receive an end of the rod and to allow the rod to freely move through the rod housing.

18. The turbomachine of claim 17, wherein the end of the rod has a threaded section configured to receive a nut.

19. The turbomachine of claim 17, further comprising:
a pin connecting the pivoting part to the rod.

20. The turbomachine of claim 17, wherein the pivoting part is configured to be attached to the cartridge such that the pivoting part is free to pivot.

21. The turbomachine of claim 20, wherein the rod housing is configured to be attached to the cartridge such that the rod housing is configured to freely rotate.

22. The turbomachine of claim 17, wherein the roller is configured to contact a driving ring and act on the driving ring with a force generated by the spring mechanism.

23. The turbomachine of claim 17, wherein the spring mechanism is removable from the rod.

24. The turbomachine of claim 17, wherein the spring mechanism is a Bellville spring.

* * * * *